United States Patent
Dawson et al.

(10) Patent No.: US 6,336,042 B1
(45) Date of Patent: Jan. 1, 2002

(54) REVERSE LINK ANTENNA DIVERSITY IN A WIRELESS TELEPHONY SYSTEM

(75) Inventors: Michael T. Dawson, Manchester; Charles H. Bianchi, Durham; Thomas J. Johnson, Bedford, all of NH (US)

(73) Assignee: Transcept, Inc., Manchester, NH (US)

( * ) Notice: Subject to any disclaimer, the term of this patent is extended or adjusted under 35 U.S.C. 154(b) by 0 days.

(21) Appl. No.: 09/092,638

(22) Filed: Jun. 5, 1998

(51) Int. Cl.[7] .................................................. H04M 1/00
(52) U.S. Cl. .......................... 455/562; 455/101; 455/137
(58) Field of Search ................................. 455/422, 561, 455/562, 101, 103, 133, 137, 4.1, 3.1, 3.3, 403, 167.1, 424; 379/56.1, 56.2, 56.3

(56) References Cited

U.S. PATENT DOCUMENTS

| | | | |
|---|---|---|---|
| 4,776,032 A | * 10/1988 | Odate et al. ................ 455/24 |
| 4,882,765 A | 11/1989 | Maxwell et al. | |
| 5,067,173 A | 11/1991 | Gordon et al. | |
| 5,129,098 A | 7/1992 | McGirr et al. | |
| 5,321,736 A | 6/1994 | Beasley | |
| 5,381,459 A | 1/1995 | Lappington | |
| 5,390,235 A | * 2/1995 | Beasley ......................... 379/60 |
| 5,396,484 A | 3/1995 | Itoh | |
| 5,452,473 A | 9/1995 | Weiland et al. | |
| 5,499,241 A | 3/1996 | Thompson et al. | |
| 5,513,176 A | 4/1996 | Dean et al. | |
| 5,590,173 A | * 12/1996 | Beasley ......................... 379/58 |
| 5,781,541 A | * 7/1998 | Schneider ....................... 370/335 |
| 5,781,859 A | 7/1998 | Beasley | |
| 5,790,944 A | * 8/1998 | Karki et al. .................. 455/226.2 |
| 5,802,173 A | 9/1998 | Hamiton-Piercy et al. | |
| 5,809,395 A | * 9/1998 | Hamilton-Piercy et al. .. 455/4.1 |
| 5,809,422 A | * 9/1998 | Raleigh et al. ................ 455/449 |
| 6,026,284 A | * 9/1998 | Seo ............................... 455/115 |
| 5,822,324 A | * 10/1998 | Kostresti et al. .............. 370/487 |
| 5,825,762 A | 10/1998 | Kamin, Jr. et al. | |
| 5,867,763 A | * 2/1999 | Dean et al. ..................... 455/5.1 |
| 5,918,154 A | * 6/1999 | Beasley ........................ 455/11.1 |
| 5,953,670 A | * 9/1999 | Newson ......................... 455/454 |
| 5,960,353 A | * 9/1999 | Lee ................................ 455/453 |
| 6,023,625 A | * 2/2000 | Myers, Jr. ...................... 455/503 |
| 6,122,529 A | * 9/2000 | Sabat, Jr. et al. ............. 455/561 |
| 5,805,983 A | * 10/2000 | Naidu et al. ................. 455/67.6 |
| 6,128,470 A | * 10/2000 | Naidu et al. ................... 455/16 |

FOREIGN PATENT DOCUMENTS

| GB | 2253770 A | 9/1992 |
| GB | 2289198 A | 11/1995 |

* cited by examiner

Primary Examiner—William Trost
Assistant Examiner—Congvan Tran
(74) Attorney, Agent, or Firm—Kirkpatrick & Lockhart LLP

(57) ABSTRACT

A wireless telephony system is described wherein remotely distributed transceivers, each of which has only a single antenna for receiving signals from wireless telephones, and such remote transceivers are located close enough so adjacent transceivers receive signals from the same wireless telephones to provide reverse link antenna diversity to help prevent loss of signal from a wireless telephone.

6 Claims, 5 Drawing Sheets

REVERSE LINK ANTENNA DIVERSITY IN A WIRELESS TELEPHONY SYSTEM

FIELD OF THE INVENTION

The present invention relates to wireless telephony equipment, and more particularly to an improved arrangement for providing antenna diversity using remote transceivers in a wireless telephone system that incorporates an existing broadband distribution network, such as a cable television network cable, to carry communication signals between wireless telephones and centrally located telephony equipment.

BACKGROUND OF THE INVENTION

The prior art teaches the use of an existing broadband network to carry telephony signals between an existing telephone network and a large number of remote transceivers positioned to provide signal coverage in defined cells or sectors. The remote transceivers, sometimes called Remote Antenna Drivers (RADs), are used to establish wireless telephony communication links with wireless telephones operating with a defined area covered by each RAD. The broadband networks include fiber-optic cable, coaxial cable, radio links and combinations of these.

Between the telephone network and the broadband network is centrally located equipment which is part of the wireless telephony equipment, and which processes and carries the telephony signals between the telephone network and the broadband distribution network.

A large number of distributed remote transceivers, also called Remote Antenna Drivers (RADs) are connected to the broadband distribution network. The RADs communicate via the broadband distribution network with Remote Antenna Signal Processors (RASPs), which are a centrally located part of the wireless telephony equipment. The RADs and RASPs use radio frequency carrier signals to carry telephony signals over the broadband distribution network. The RASPs in turn communicate with the telephone network via a Base Telephone Station (BTS). The RADs, RASPs and BTS cooperate to carry telephony signals between wireless telephones and the telephone network. The RADs transmit radio frequency signals to, and receive radio frequency signals from wireless telephones in a manner well known in the art.

In the prior art each RAD has two antennas for receiving telephony signals from wireless telephones, and the signals from all receive antennas are concurrently transmitted over the broadband distribution network to the centrally located RASP and BTS for signal processing before the telephony signals are sent to the telephone network. Typically, one of the two receive antennas is called the primary receive antenna and the other receive antenna is called the diversity receive antenna. These two antennas are physically spaced and cooperate to minimize signal fading, and thereby provide continuous signal reception from wireless telephones.

The use of two receive antennas in each RAD requires duplicate receive circuitry therein, which increases the cost of each RAD. In addition, each RASP must process two received telephony signals from each RASP for each wireless telephone. This also requires duplicate circuitry which increases the cost of each RASP. Thus, there is a need in the art for simpler, less expensive RADs and RASPs, while not sacrificing signal reception from wireless telephones.

SUMMARY OF THE INVENTION

The above described need in the wireless telephony art is satisfied by the present invention. The Remote Antenna Drivers (RADs) and the Remote Antenna Signal Processors (RASPs) are made simpler, deleting duplicate circuitry, while not sacrificing good received signal reception from wireless telephones.

In existing wireless telephony systems, of the type described above, there are two antennas on each RAD for receiving signals from wireless telephones. These two antennas are called the primary and diversity antennas and are spaced from each other. Typically, even when a wireless telephone is "within range" of a RAD its received signal strength from one antenna may fade while the received signal from the other antenna remains strong. The RAD returns both received signals to its associated RASP and BTS where the two signals are combined with the overall result being no signal fading.

In implementing the present invention, in each of the RADs one of the two receive antennas and all of its associated circuitry is eliminated. Accordingly, with each RASP not having to process two signals from each RAD for each wireless telephone call, the circuitry in each RASP is greatly simplified with a corresponding cost saving.

To compensate for the signal fading problem without two receive antennas on each RAD, RADs are placed closer together so they have coverage areas that overlap more than provided in the prior art. Thus, adjacent RADS receive signals from a wireless telephone and concurrently transmit the signals to the RASP. By having more closely spaced RADs there are fewer dead spots where signal coverage is not provided by any RAD. This is a problem well known in the art. The improved area coverage and equipment cost savings are accomplished without increasing the service load on the wireless telephone system. In addition, the BTS need not be changed, and can function with prior art RADs and RASPs or RADs and RASPs implementing the present invention. Furthermore, a greater area is covered with the same reverse bandwidth in the broadband network.

As is known in the art, RADs are spaced along the broadband distribution network cable, and their individual areas of coverage overlap somewhat to provide continuous signal coverage when handing off calls, but not for extended coverage overlap. In implementing the present invention RADs are placed closer together as mentioned above. With RADs being spaced closer together, signals from a wireless telephone are received by more than one RAD at a time. Adjacent RADs receiving signals from a wireless telephone each forward the signals via the broadband network to the RASP associated with the RADs. Diversity is achieved by alternating primary and diversity assignments across adjacent RADs. This operation provides reverse link site diversity and the same reliable, continuous signal coverage as when there is a primary and diversity receive antenna on each RAD.

Also, as is known in the art, one reverse frequency channel is used for the primary, and another for the diversity antenna, for each RAD. In implementing the present invention, each RAD has only one receive antenna, and adjacent RADs are assigned either primary or diversity roles. As a result of the invention, more RADs are served by the same reverse bandwidth (i.e. primary and diversity reverse channels) in the broadband network.

In accordance with the teaching of the present invention, the one receive antenna on a first RAD acts as a primary antenna, while the one receive antenna on a second, adjacent RAD acts as the diversity antenna to the first RAD, and so on in an alternating fashion between RADS along the Broadband Distribution Network.

Due to the overlapping signal coverage of the more closely spaced RADs, and signals from a wireless telephone being forwarded by more than one RAD to the RASP and BTS, the telephony signals are combined, just as in the prior art. Thus, the advantage of the primary and diversity receive antenna RADs is maintained.

DESCRIPTION OF THE DRAWING

The invention will be better understood upon reading the following Detailed Description in conjunction with the drawing in which.

DETAILED DESCRIPTION

Figure 1:
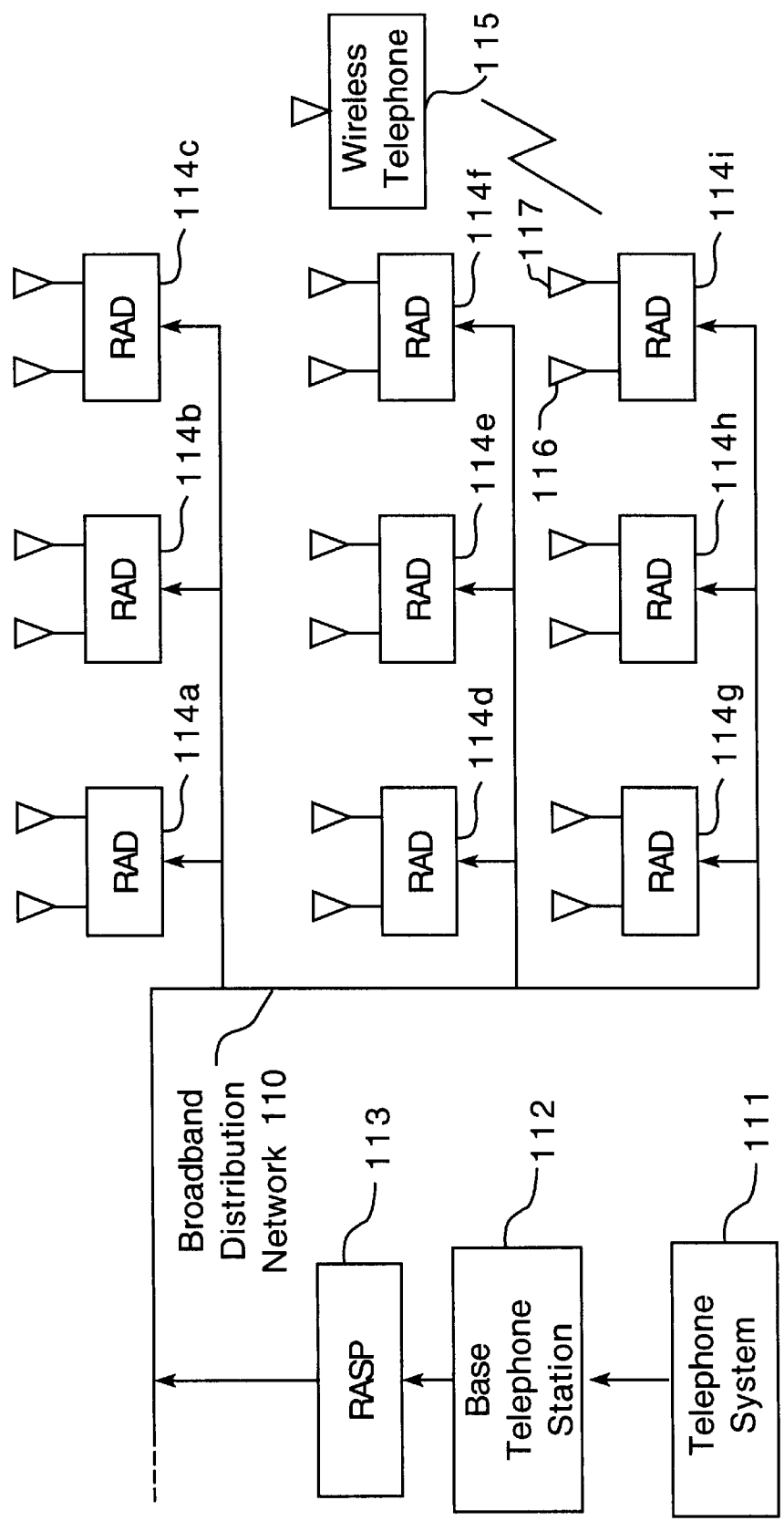
FIG. 1 is a block diagram of an exemplary wireless telephony system integrated with an exemplary broadband distribution network.

In the drawing and following detailed description all circuit elements are assigned three digit reference numbers. The first digit of each reference number indicates in which figure of the drawing an element is located. The second and third digits of each reference number indicate specific circuit elements. If the same circuit element appears in more than one figure of the drawing, the second and third digits of the reference number for that circuit element remain the same and only the first digit of the reference number changes to indicate the figure of the drawing in which the referenced circuit element is located. Thus, for examples, RAD circuit 319 described with reference to FIG. 3 is the same RAD circuit 419 that is described with reference to FIG. 4; and RAD 114a in FIG. 1 is the same as RAD 214a in FIG. 2.

The term "reverse direction" refers to any signals traveling toward Telephone System 111, and the term "forward direction" refers to any signals traveling toward wireless telephone 115. In the Cable Television industry the "forward direction" is referred to as "downstream", and the "reverse direction" is referred to as "upstream". This is mentioned because the wireless telephone system described herein can be utilized with the cable of a cable television distribution network.

As used herein the term "telephony signals" includes voice, data, facts and any other type of signals that are sent over a telephone network now or the future.

In FIG. 1 is shown a simplified block diagram of an exemplary broadband distribution network 110 integrated with elements of a wireless telephone system which includes a plurality of remote transceivers known as Remote Antenna Drivers 114a–i (RADs), centrally located transceivers known as Remote Antenna Signal Processors 113 (RASP), and a Base Telephone Station 112 (BTS). There are different types of broadband distribution networks 110 in use, and such networks may utilize coaxial cable, fiber optic cable, microwave links, or combinations of these. The broadband distribution network 110 disclosed herein is a conventional hybrid fiber coaxial (HFC) cable to which a plurality of RADs 114a–i are connected. Electrical power is distributed along broadband distribution network 110 to power line amplifiers (not shown) of the broadband distribution network. This electrical power source, or alternate power sources, are used to provide power to RADs 114a–i.

Telephony signals and control signals to be sent between Telephone System 111 and wireless telephones 115 are carried via BTS 112, RASP 113, broadband network 110, and RADs 114a–i.

Integrated with broadband distribution network 110 is a wireless telephony system in which the present invention is utilized. One such wireless telephony system is taught in U.S. patent application Ser. No. 08/695,175, filed Aug. 1, 1996, and entitled "Apparatus And Method For Distributing Wireless Communications Signals To Remote Cellular Antennas". The telephony system disclosed herein includes a Base Telephone Station (BTS) 112 which is connected to a telephone system 111. BTS 112 is also connected to Remote Antenna Signal Processor (RASP) 113 which is the interface to broadband distribution network 110. Only one BTS 112 and one RASP 113 are shown in FIG. 1 for simplicity. In reality, there are generally many BTS 112 and RASP 113 circuits to handle telephony traffic in the wireless telephony system. Similarly, only nine RADs 114a–i are shown in FIG. 1, but in reality there are a large number of RADs 114 in a typical wireless telephone system.

As is known in the prior art, including the above cited prior patent application, one or more frequency bands or channels of the broadband distribution network 110 are reserved to carry telephony signals between telephone system 111 and wireless telephones 115. Telephony signals originating from telephone system 111 pass through BTS 112 and are transmitted by RASP 113, in frequency division multiplexing format, over broadband network 110 to ones of the plurality of RADs 114a–i which are also connected to broadband distribution network 110. Telephony signals originating at wireless telephones 115 are frequency multiplexed together by RADs 114a–i and transmitted along with control signals via broadband network 110 to an associated RASP 113, then to BTS 112, and finally to telephone system 111.

In Base Telephone Station (BTS) 112 there are a plurality of transceiver modules (not shown), as is known in the wireless telephony art, each of which operates at a single channel frequency at a time, and which can handle a predetermined maximum number of telephone calls from wireless telephones. In the wireless telephone system described and claimed herein, the frequency that the RADs 114a–i are assigned to operate at must correspond to the operating frequency of an assigned BTS 112 transceiver module. If a particular RAD 114a–i is re-assigned to function with a different transceiver module within BTS 112, circuit settings within the particular RAD 114a–i must be changed to function with the different transceiver module. In the wireless telephony art, transceiver modules in BTS 112 are also referred to as channel card modules and radio modules.

In FIG. 1 are shown three rows of RADs 114a–i. Typically a number of RADs 114 are spaced along, and connected to, Broadband Distribution Network 110 to provide overlapping signal transmission and reception coverage for the entire wireless telephone system. In accordance with the teaching of the present invention the RADS 114*a–i* are physically located close enough so that signals from a wireless telephone 115 operating in the cell covered by, for example, RAD 114*b* are also received by adjacent RADs 114*a*&*c*.

Each RAD 114 has two antennas 116 and 117; one used to transmit signals to remote wireless telephones 115, and the other used to receive signals from remote wireless telephones 115. Antenna 117 is used to transmit telephony signals to wireless telephones 115, and antenna 116 is used to receive telephony signals from wireless telephones 115. RADs 114*a–e* comprise a cluster which all carry (simulcast) communication signals between wireless telephones 115 and a RASP 113.

Figure 2:
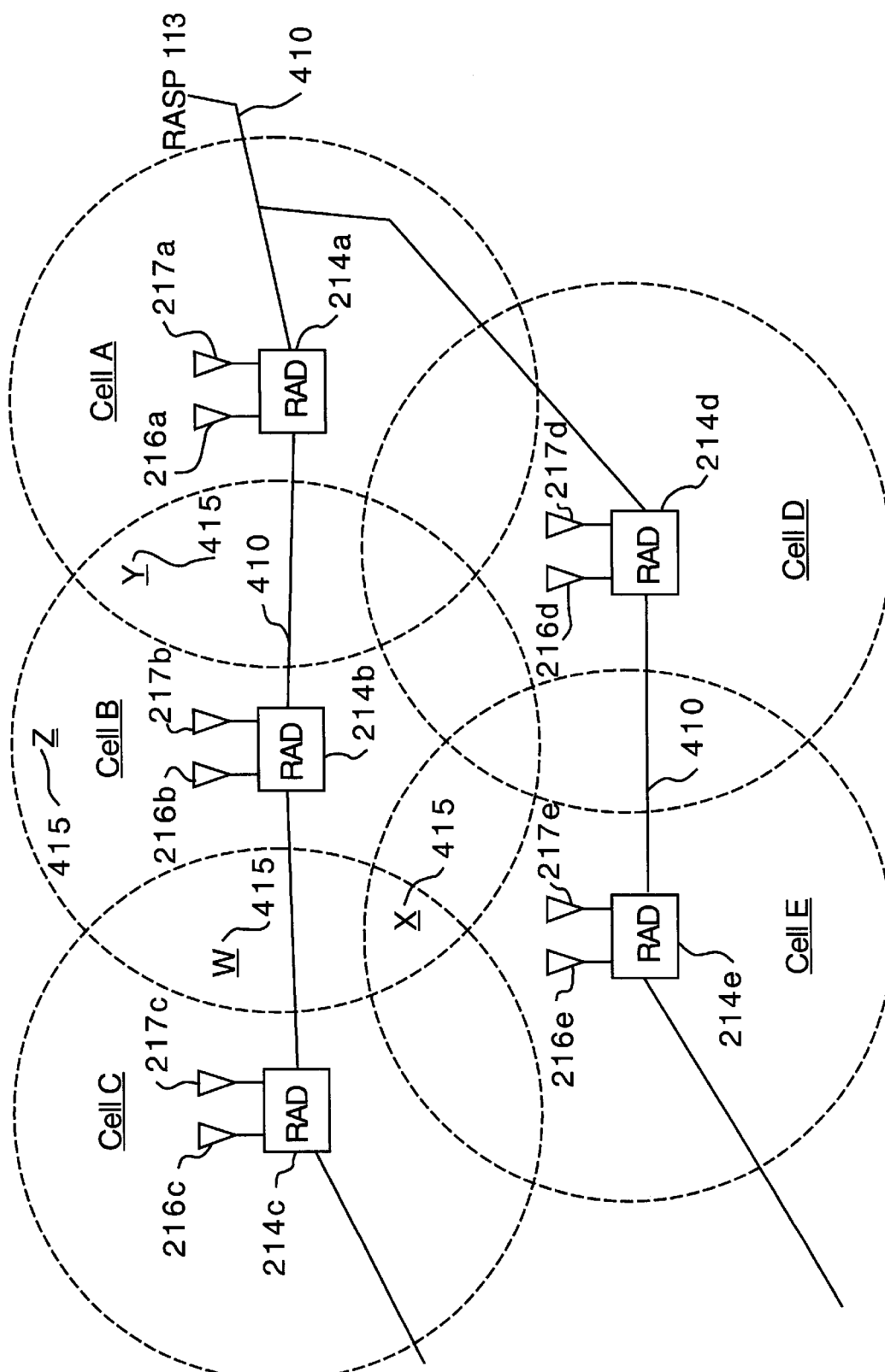
FIG. 2 is a diagram showing a number of cells positioned to provide overlapping signal coverage using remote transceivers (RADs) spaced closer together to implement the teaching of the present invention.
Figure 3:
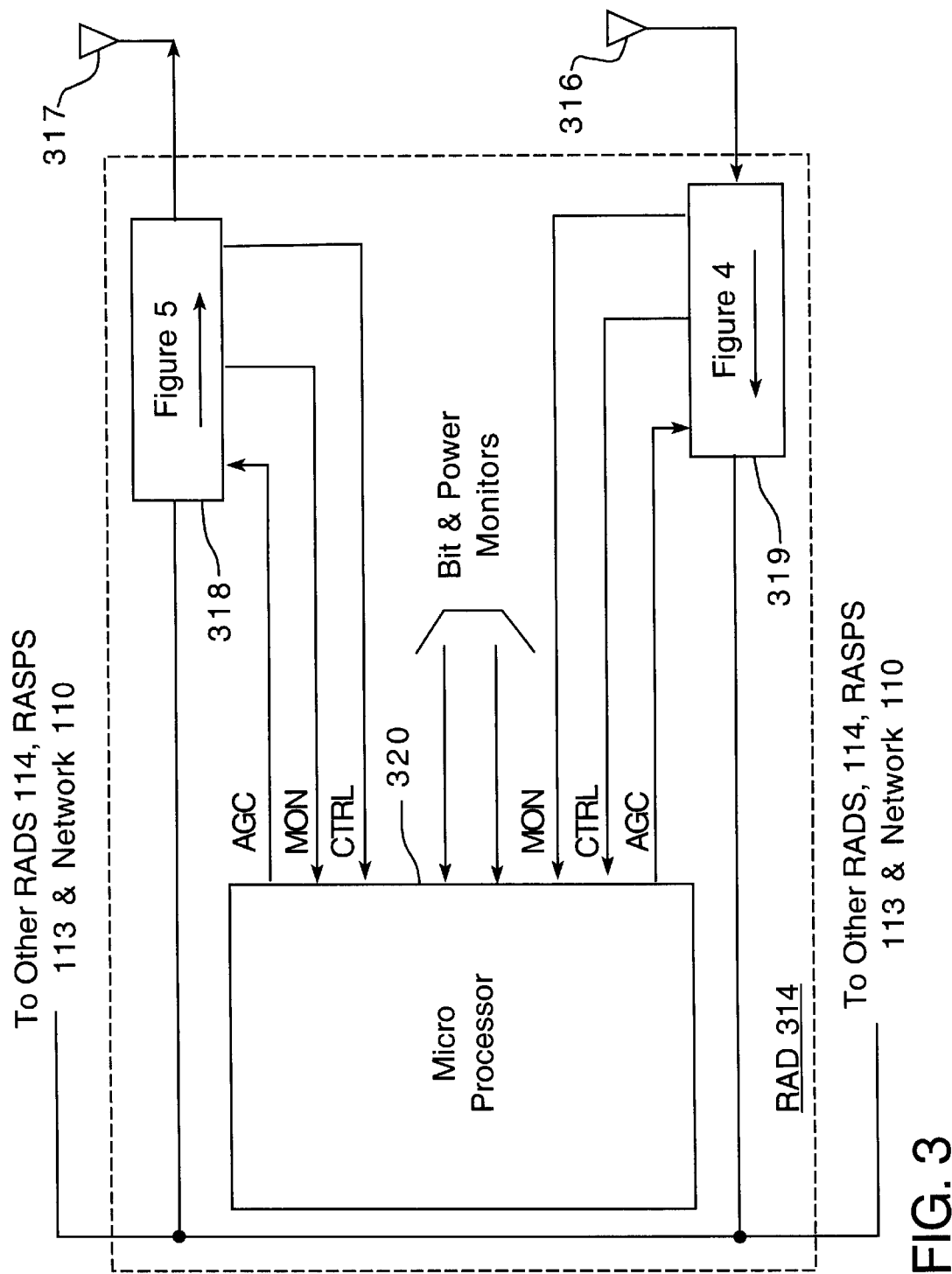
FIG. 3 is a simplified block diagram of a remote transceiver (RAD)

In FIG. 2 is a diagram showing a number of cells providing overlapping signal coverage provided by RADs 114*a–i* that are spaced closer together and each has only one receive (216*a–i*) and one transmit (217*a–i*) antenna in accordance with the teaching of the present invention. The overlapping cells are designated Cell A through Cell E, for each of which a RAD 214 provides wireless telephony service. RAD 214*a* provides service to Cell A, RAD 214*b* provides service to Cell B, through RAD 214*e* providing service to Cell E.

Cells A–E are spaced close enough that, typically, a wireless telephone is operating in more than one cell at a time, and its transmitted signals are received by more than one RAD at a time. Thus, for example, a wireless telephone 415 located at position W is within both Cells B and C and its transmitted signals are received by both RADs 214*b*&*c*. If wireless telephone 415 is located at position X, it is within Cells B,C and E and its transmitted signals are received by RADs 214*b*,*c*&*e*. No matter where a wireless telephone 415 is located when it is in operation, all RADs receiving its signal forward the signal via Broadband Distribution Network 410 to RASP 113 where the signals are processed and combined and forwarded via BTS 112 to telephone system 111.

If wireless telephone 415 moves from position W to position Y through position Z, it is then in the area of coverage of Cells A and B, and it's transmitted signal is received by 20 RADs 214*a*&*b* and forwarded to RASP 113. There are instances in fringe areas of the simulcasting cluster shown in FIG. 2, such as at position Z in cell B, where the signals transmitted by a wireless telephone 415 are received by only a single one of RADs 214*a–e*. FIG. 2 shows a single cluster of RADs wherein position Z is located, but there may an adjacent cluster of RADs (not shown) whose coverage area overlaps position Z, depending on network layout. Even in that instance the signal is transmitted via Broadband Distribution Network 410 to RASP 113 and via BTS 112 to telephone system 111.

Thus, with the above described arrangement of cells that overlap more than is done in the prior art, the advantage of prior art RADs having primary and diversity receive antennas is still provided.

In FIG. 3 is shown a general block diagram of a RAD 314. RAD 314 has a first circuit 318, that is shown in detail in FIG. 5, and that receives telephony signals originating at telephone system 111 and carried via BTS 112, RASP 113 and broadband distribution network 110 to RAD circuit 318 which transmits the signals via antenna 317 to a remote wireless telephone 115 (not shown). There is also a second circuit 319 of RAD 314, that is shown in detail in FIG. 4, that receives telephony signals originating at a wireless telephone 115 (not shown) via antenna 316, and transmits the received signals via broadband distribution network 110, RASP 113 and BTS 112 to telephone system 111.

As is known in the prior art, frequency multiplexed with the telephony signals carried both ways between RASP 113 and a RAD 314 are signals for interrogating, reporting, and controlling the various circuitry settings in RAD 314. There are different types of control signals that can be sent from RASP 113 to RAD 314, and each control signal has an address associated therewith that is recognized by only one RAD. Microprocessor 320 communicates with RAD circuits 318 and 319 via leads AGC, MON, CTRL and other leads to receive and transmit the various signals and to respond thereto as is described in greater detail with reference to FIGS. 4 and 5.

Figure 4:
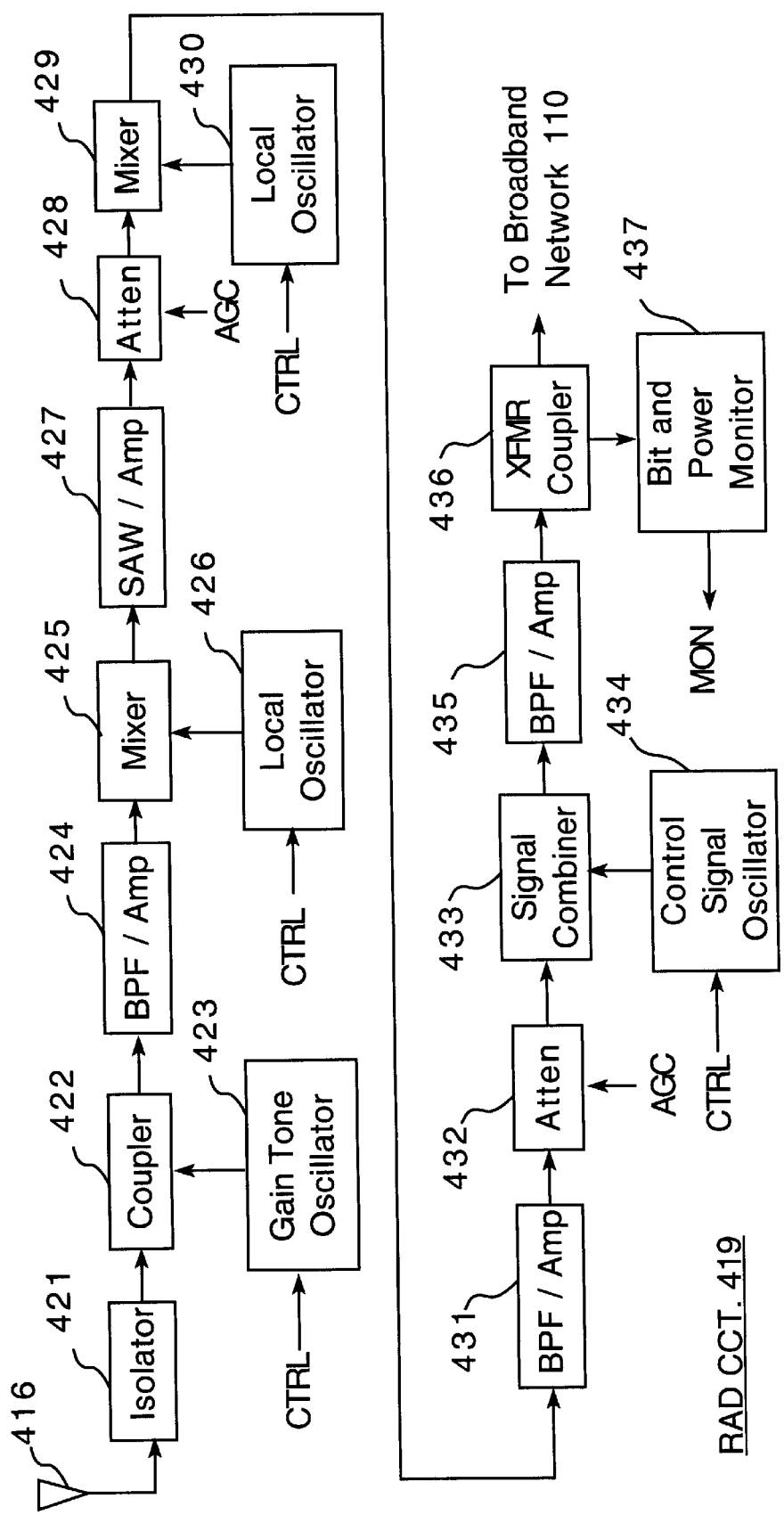
FIG. 4 is a detailed block diagram of that portion of a remote transceiver (RAD) that receives telephony signals from wireless telephones and transmits them via a broadband distribution network to a central transceiver (RASP) and BTS.

In FIG. 4 is shown a detailed block diagram of RAD circuit 419 within a RAD 114 that receives telephony signals from a wireless telephone (not shown), and re-transmits them via broadband distribution network 110, RASP 113 and BTS 112 to telephone system 111.

Telephony signals received from a wireless telephone 115 (not shown) are received by the one receive antenna 416. As previously described this is normally happening in more than one RAD at a time. The received signals are input to isolator 421 which isolates antenna 416 from other circuitry in RAD circuit 419. The received signal is then input to directional coupler 422 that has a second signal input thereto from gain tone oscillator 423 which is used to implement gain control in RAD circuit 419.

The telephony signal (modulated RF carrier) received from a remote wireless telephone 115, and the gain control, low level calibration signal (described below), are filtered and then amplified by a combined band pass filter and amplifier 424. The signal is amplified and extraneous signals are filtered from the received telephony signal of interest.

The amplified and filtered telephony signal and gain control signal are then input to mixer 425 which is the first of two heterodyning stages used to convert the carrier frequency of the telephony signal to the selected carrier frequency used for transmission over broadband distribution network 110 to RASP 113. Mixer 425 also has input thereto a signal from local oscillator 426.

The frequency of local oscillator 426 is digitally controlled and is determined by a binary word applied to its control input CTRL from microprocessor 320 in FIG. 3, responsive to control signals received from RASP 113 (not shown in this Figure). A control signal sent from remote RASP 113 to microprocessor 320 in FIG. 2 causes microprocessor 320 to send the proper binary word to control input CTRL of local oscillator 426 to set the frequency of the local oscillator. Similarly, the control signal from remote RASP 113 causes microprocessor 320 to set the frequency of digitally controlled local oscillator 430, and other local oscillators in RAD circuit 518 shown in FIG. 5, depending on the carrier frequency chosen to transmit telephony and control signals over broadband distribution network 110.

The operation of mixer 425 results in multiple frequencies being output from the mixer as is known in the art. All these signals are input to narrow pass band SAW filter and amplifier 427 which selects only the difference frequency carrier modulated by the telephony signal and gain control signal created by mixer 425 and amplifies same. The signals that pass through SAW filter 427 are lower in frequency to be closer to the frequency required for transmitting the telephony signal via broadband distribution network 110 to RASP 113.

The frequency shifted carrier, modulated by the telephony signal, and the gain tone signal are then input to step attenuator 428 which is used to adjust the gain level of the signals in one-half dB steps. The amount of attenuation provided by step attenuator 428 is controlled by a binary word at its control input AGC from microprocessor 320 (not shown). The control of step attenuators 428 and 432 is accomplished responsive to control signals received from RASP 113 as part of the gain control operation that controls the signal level of the telephony signals.

The frequency shifted carrier with telephony signal and gain control signal modulating same that is output from step attenuator 428 is input to mixer 429 along with a signal from local oscillator 430. Mixer 429 is the second of the aforementioned two heterodyning stages used to convert the telephony signal carrier down to the desired frequency for transmission over an assigned channel of broadband distribution network 110 to RASP 113.

The frequency of local oscillator 430 is also determined by a binary word applied to its control input CTRL. As described above a control signal is sent from RASP 113 which causes microprocessor 320 to set the frequency of local oscillators 426 and 430 depending on the carrier frequency chosen to transmit the telephony signal over broadband distribution network 110.

The operation of mixer 429 results in multiple frequencies being output from the mixer as is known in the art. All these signals are input to bandpass filter and amplifier 431 which selects only the difference frequency carrier and amplifies same.

The filtered and amplified signal output from circuit 431 is input to step attenuator 432 to adjust the gain level of the signal. Similar to the operation of step attenuator 428, this digitally controlled attenuator is set by control signals at its control input AGC responsive to control signals received from remote RASP 113 as part of the gain control operation.

The signal output from step attenuator 432 is input to signal combiner 433 which has a second input from control signal oscillator 434. Control signal oscillator 434 includes a local oscillator, the frequency of which is controlled by a binary signal on control leads CTRL from microprocessor 320 to set the frequency of the oscillator. Again RASP 113 is the origin from which the control signal is received to set the frequency of control signal oscillator 434. Responsive to different control signals received via RASP 113 microprocessor 320 sends signals to control input CTRL of control signal oscillator 434 which cause control signal oscillator 434 to produce an information signal to be sent to RASP 113. The information signal indicates various information about RAD 114 to BTS 113, including the settings of step attenuators 428, 432, 547, and 549 as part of the gain control operation. This information is used to keep an updated status regarding each of the RADs 114a–i.

The output from signal combiner 433 now has two signals frequency multiplexed to be returned via broadband network 110 to RASP 113. The signals are the telephony communication signal received by antenna 416, and the system information signal output from control signal oscillator 434. These frequency multiplexed signals are input to band pass filter and amplifier 435 to amplify the signals and to remove any extraneous signals before the signals are coupled via transformer coupler 436 to broadband distribution network 110 to be sent via RASP 113 for signal processing.

Transformer coupler 436 is an impedance matching transformer having 50 ohm primary and 75 ohm secondary windings. When broadband distribution network 110 uses coaxial cable, the secondary winding of transformer 436 is wired in series with the center conductor of the video distribution coaxial cable. As previously described, a RAD 114 hangs from the coaxial cabling of the broadband distribution network 110 to which it is connected. In other applications, such as with fiber optic cable, other well known frequency conversion and signal coupling techniques are used.

A small portion of the frequency multiplexed signals passing through transformer coupler 436 is input to Built In Test (BIT) and power monitor 437. BIT and power monitor 437 samples the signal level of the combined signal that is being transmit via broadband distribution network 110 and reports this information to RASP 113 via control signal oscillator 434 which is described above. In the event that RASP 113 detects a drop in received signal level from a RAD 114, it sends a control signal to the particular RAD 114 which causes the previously described gain control signal from gain control oscillator 423 to be injected and gain control information to be returned to RASP 113. In this manner RASP 113 can determine where the signal loss is occurring. Thereafter, other control signals can be sent from RASP 113 to a RAD 114 causing changes to the settings of attenuators 428, 432, 547 and 549 to adjust the gain level of the RAD.

Figure 5:
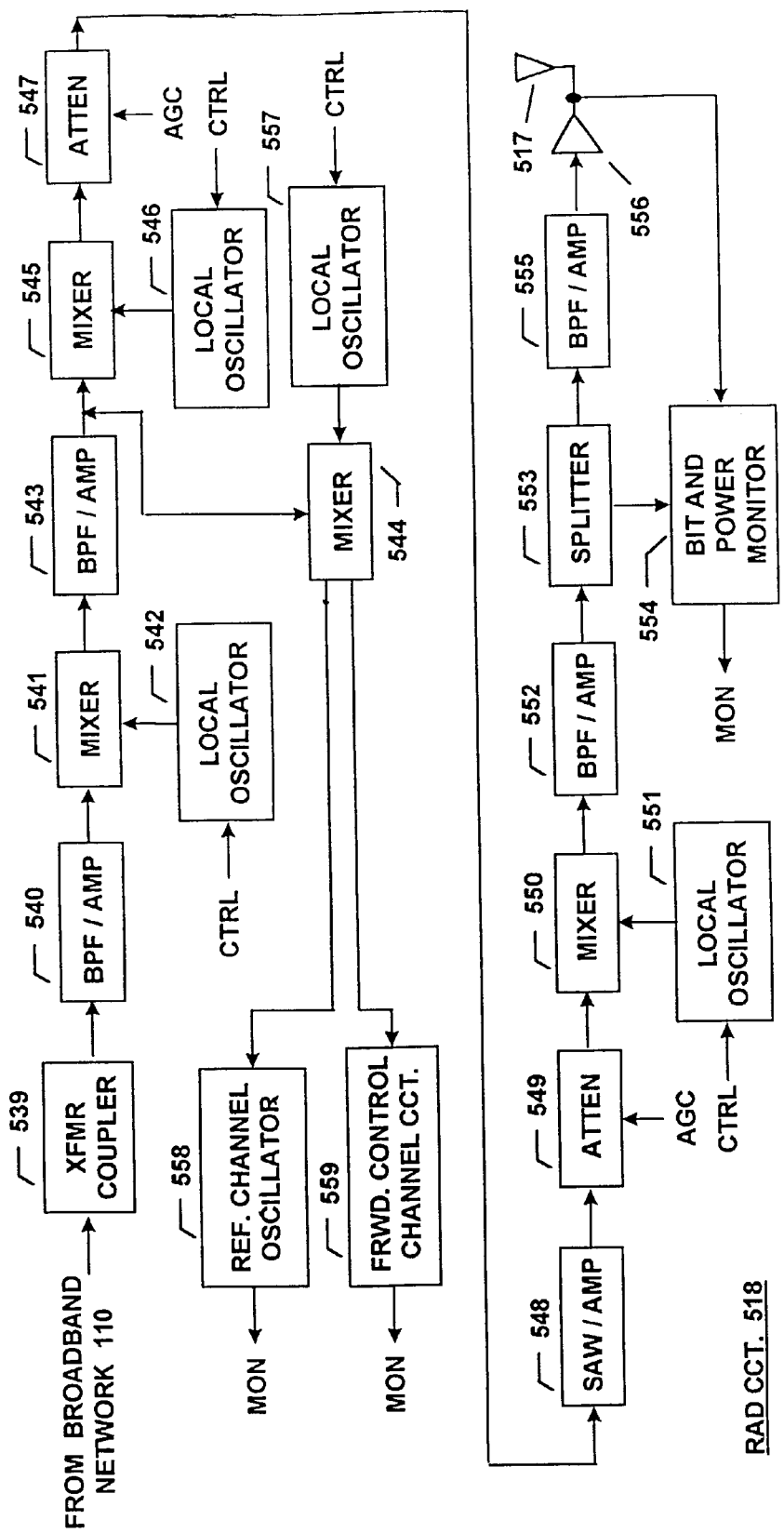
FIG. 5 is a detailed block diagram of that portion of a remote transceiver (RAD) that receives telephony signals via a broadband distribution network from a central transceiver (RASP) and BTS and transmits them to a wireless telephone.

In FIG. 5 is shown a detailed block diagram of RAD circuit 518 that carries telephony signals originating at telephone system 110 and carried via BTS 112, RASP 113 and broadband distribution network 110 to RAD circuit 518 for transmission to a wireless telephone 115. As previously described, RAD 114 hangs from and is connected to cabling of broadband distribution network 110. Transformer coupler 539 is an impedance matching transformer having 75 ohm primary and 50 ohm secondary windings. When broadband distribution network 110 is coaxial cable, the primary winding of transformer 539 is wired in series with the center conductor of the coaxial cable. Transformer 539 is used to connect frequency multiplexed communications and control signals carried on broadband distribution network 110 to the input of all RADs 114. Only the RADs 114, the receive frequency which has been tuned by control signals from RASP 113 to the particular frequency of the signals on broadband distribution network 110 actually receive sand forwards the telephony signals to a wireless telephone 115.

All RADs receive control signals directed toward any one of those RADs. However, each RAD 118 has a unique address that is used by it to accept only control signals directed specifically to it by RASP 113.

The frequency multiplexed telephony and control signals received by RAD circuit 518 are input to band pass filter and amplifier 540. This filter passes all frequency multiplexed telephony communication and control signals that are carried in the assigned channel on broadband distribution network 110, and excludes all television and other signals carried on broadband distribution network 110. Circuit 540 also amplifies these signals.

The received and amplified signals are input to mixer 541 along with a signal from local oscillator 542. Alike the local oscillators shown in FIG. 4 and described with reference to that Figure, the frequency of local oscillator 542 is digitally controlled at its input CTRL by a signal from microprocessor 320 responsive to control signals microprocessor 320 receives from RASP 113. In a manner well-known in the art, mixer 541 mixes the received signals and the signal from local oscillator 542 and outputs many signals which include the communication and control signals meant for this RAD 114. However the frequency of interest is now shifted downward toward the carrier frequency that will be used to transmit communication signals via transmit antenna 517 to wireless telephones 115.

The different frequencies output from mixer 541 are input to band pass filter and amplifier 543 which is tuned to pass and amplify only the telephony and control signals output from mixer 541 and specifically directed to this RAD 114.

The selected set of telephony and control signals are now input to mixer 545 of a second heterodyning stage. Mixer 545 has an input from a local oscillator 546. Alike other local oscillators in FIGS. 4 and 5, oscillator 546 is digitally controlled by microprocessor 320 responsive to control signals received from RASP 113 and BTS 112. In a manner well-known in the art, mixer 545 combines the signals input to it and provides a number of output signals at different frequencies. All these frequencies are input to an attenuator 547 which is used to adjust the gain level of the signals. Attenuator 547 is part of the gain control system and is digitally controlled in 1/2 dB steps by control signals at its input CTRL from microprocessor 320.

The gain adjusted signal output from attenuator 547 is input to SAW filter and amplifier 548. SAW filter 548 has a relatively narrow bandpass and passes only the telephony communication signals at the right carrier frequency and amplifies same. Control signals frequency multiplexed with the telephony signal do not pass through SAW filter 548. Instead, the control signals are input to mixer 544 and are extracted and used as is described further in this specification.

The telephony communication signals passed through SAW filter 548 are further shifted in frequency toward the carrier frequency used for transmitting the telephony signal via transmit antenna 517 to remote wireless telephones 115 (not shown). The telephony signal is input to digitally controlled attenuator 549 to adjust the gain level of the signal before it is input to mixer 550 along with the output of digitally controlled local oscillator 551. Attenuator 549 is part of the end to end automatic gain control system and is digitally controlled in 2 dB steps. Attenuator 549 is responsive to control signals received from microprocessor 320 at its CTRL input, alike other digitally controlled attenuators in the RAD.

The amplitude adjusted signal output from attenuator 549 is input to the third heterodyning stage which includes mixer 550 and digitally controlled local oscillator 551. The frequency of operation of local oscillator 551 is set by a binary control word on its control input CTRL which is received from microprocessor 320 responsive to a control signal received from RASP 113.

Mixer 550 combines the two signals in a manner well-known in the art to produce several output signals, one of which is the telephony signal having the desired carrier frequency for transmission to a remote wireless telephone 115. The signals output from mixer 550 are input to band pass filter and amplifier 552. Band pass filter 552 passes only the desired carrier frequency. The signal is also amplified before being input to signal splitter 553.

The telephony signal input to splitter 553 is divided and a portion of the signal goes to BIT (Built In Test) and power monitor 554, while the remainder of the signal is input to band pass filter and amplifier 555. Bandpass filter 555 assures that there are no extraneous signals combined with the desired telephony signal, and amplifies same, before that signal is applied to power amplifier 556. Power amplifier 556 amplifies the communication signal and applies it to transmit antenna 517. The signal is transmitted within the area of the cell or sector covered by this RAD 114, and is received by a remote wireless telephone 115 which is presently communicating with this RAD 114.

A portion of the output from power amplifier 556 is also input to BIT and power monitor 554 along with the portion from signal splitter 553. The portions are sampled to determine the signal level of the telephony signal and carrier and reports this information via its output MON to microprocessor 320. Microprocessor 320 controls control signal oscillator 434 to report this information back to RASP 113 as previously described with reference to oscillator 434. This information is used by RASP 113 as part of the automatic gain control operation and testing of the system. In the event that RASP 113 detects a drop in the signal level as reported by bit and power monitor 554, it sends a control signal to microprocessor 320 to adjust the gain in RAD circuit 518 by re-setting attenuators 547 and 549.

A portion of the first intermediate frequency output from bandpass filter and amplifier 543 is input to mixer 544 along with the output from binary controlled local oscillator 557. The frequency of operation of local oscillator 557 is set by a binary word on its CTRL input from microprocessor 320 responsive to a control signal received from RASP 113.

The output of mixer 544 is input to reference channel oscillator 558 and forward control channel circuit 559. Circuit 559 removes all frequency multiplexed control signals sent from RASP 113 and sends them to microprocessor 320 to be acted upon as described herein with reference to reporting of system operation and settings of attenuators and oscillators. Control signals have a RAD address as part of the control signals and each RAD 114 has a unique address. Therefore, microprocessor 320 in each RAD 114 will only recognize and act upon control signals directed to it.

When a RAD 114 receives control signals directed to it, microprocessor 320 responds thereto to perform the action requested by RASP 113. The control signal may ask for the settings of the local oscillators and attenuators, and this information is returned to RASP 113 using control signal oscillator 434 as previously described. The control signal from RASP 113 may indicate revised settings for local oscillators and attenuators. Microprocessor 320 makes the required changes and then sends a confirmation signal back to RASP 113 indicating that the requested changes have been made, again using control signal oscillator 434. As part of the gain control operation, a control signal from RASP 113 may also request the output levels detected by BIT and power monitors 437 and 554, and then request that the output from gain tone oscillator 423 be added to the telephony signals. Responsive to any of these control signals, microprocessor 320 performs the requests.

Reference channel oscillator 558 processes the output of mixer 544 to generate a phase lock loop reference signal that is used to provide a master frequency to all local oscillators in RAD circuits 419 and 518 to match their frequency of operation with that of RASP 113.

While what has been described hereinabove is the preferred embodiment of invention, it can be understood that numerous changes may be made by those skilled in the art without departing from the scope of the invention.

What is claimed is:

1. A remote antenna driver for receiving wireless telephony signals from a wireless telecommunications device and forwarding the wireless telephony signals to a telephone system via a broadband distribution network, comprising:

a transmitting antenna for transmitting wireless telephony signals received from the telephone system over the broadband distribution network to the wireless telecommunications device;

a single receiving antenna;

a first heterodyne circuit connected to the single receiving antenna for converting a carrier frequency of the wireless telephony signals; and a coupler connected to the first heterodyne circuit for coupling the frequency converted wireless telephony signals to the broadband distribution network, and wherein first heterodyne circuit includes:

a first mixer having a first input terminal connected to the single receiving antenna, a second input terminal, and an output terminal connected to the coupler; and a first local oscillator having an output terminal connected to the second input terminal of the first mixer, wherein a frequency of an output signal from the first local oscillator is controlled by a control signal received at a control terminal of the first local oscillator from a microprocessor.

2. The remote antenna driver of claim 1, further comprising a second heterodyne circuit having an input terminal connected to an output terminal of the first heterodyne circuit and having an output terminal connected to the coupler.

3. A remote antenna driver for receiving wireless telephony signals from a wireless telecommunications device and forwarding the wireless telephony signals to a telephone system via a broadband distribution network, comprising:

a transmitting antenna for transmitting wireless telephony signals received from the telephone system over the broadband distribution network to the wireless telecommunications device;

a single receiving antenna;

a first heterodyne circuit connected to the single receiving antenna for converting a carrier frequency of the wireless telephony signals;

a coupler connected to the first heterodyne circuit for coupling the frequency converted wireless telephony signals to the broadband distribution network;

a directional coupler having a first input terminal connected to the single receiving antenna, a second input terminal, and an output terminal connected to an input terminal of the first heterodyne circuit; and a gain tone oscillator having an output terminal connected to the second input terminal of the directional coupler, wherein a frequency of an output signal from the gain tone oscillator is controlled by a control signal received at a control terminal of the gain tone oscillator from a microprocessor.

4. The remote antenna driver of claim 3, further comprising a step attenuator having an input terminal connected to an output terminal of the first heterodyne circuit, an output terminal connected to the coupler, and a control terminal connected to the microprocessor.

5. A remote antenna driver for receiving wireless telephony signals from a wireless telecommunications device and forwarding the wireless telephony signals to a telephone system via a broadband distribution network, comprising:

a transmitting antenna for transmitting wireless telephony signals received from the telephone system over the broadband distribution network to the wireless telecommunications device;

a single receiving antenna;

a first heterodyne circuit connected to the single receiving antenna for converting a carrier frequency of the wireless telephony signals;

a coupler connected to the first heterodyne circuit for coupling the frequency converted wireless telephony signals to the broadband distribution network;

a signal combiner having a first input terminal connected to the receiving antenna, a second input terminal, and an output terminal connected to the coupler; and a control signal oscillator having an output terminal connected to the second input terminal of the signal combiner, wherein a frequency of an output signal from the control signal oscillator is controlled by a control signal received at a control terminal of the control signal oscillator from a microprocessor.

6. The remote antenna driver of claim 5, wherein the control signal oscillator includes a control terminal connected to a microprocessor.

* * * * *